Nov. 29, 1966  E. S. MONROE, JR  3,288,367
STEAM TRAP IMPROVEMENT
Filed Sept. 14, 1964

INVENTOR
ELMER S. MONROE, JR.

BY *Harry E. Braddock*
ATTORNEY

United States Patent Office 3,288,367
Patented Nov. 29, 1966

3,288,367
STEAM TRAP IMPROVEMENT
Elmer Sylvester Monroe, Jr., Newark, Del., assignor to E. I. du Pont de Nemours and Company, Wilmington, Del., a corporation of Delaware
Filed Sept. 14, 1964, Ser. No. 396,310
2 Claims. (Cl. 236—56)

This invention relates generally to the field of devices which separate liquids from vapors, and which separate non-condensible gases from vapors in a system involving usually a valve unit actuated by a control means which in effect senses the heat content of the medium encountered and responds thereto to actuate the valve in a desired manner.

More specifically, this invention is concerned with an improved bellows unit for operating the valve element in such devices, or thermostatic steam trap assemblies as they are known.

Conventional thermostatic steam trap assemblies utilizing metallic bellows units, are subject to certain serious limitations and disadvantages in use, especially when operating at high pressures and temperatures. The bellows units currently available are somewhat fragile and can be damaged by suddenly applied pressure changes and "water hammer" conditions in the space surrounding the bellows unit. These limitations under such conditions have resulted in limiting the use of this type steam trap to low pressures less than 300 p.s.i. Other problems exist in these conventional steam trap assemblies, such as failures due to high stresses occurring in valve and valve seat elements created by the high closing forces which develop at higher operating pressure when the pressure suddenly drops as for example when a valve upstream of the steam trap is suddenly closed. In addition, conventional installations involve somewhat complicated and bulky structures or units departing from normal in-line conduit structure.

It is one object of this invention to provide a novel and improved bellows unit for steam trap assemblies which overcomes the limitations and disadvantages of the prior art units in that it possesses high reliability, long service life, and the ability to function with this reliability and long life at operating pressures of about 600 p.s.i. and above, even under sudden pressure drops as mentioned in the preceding paragraph.

It is another object of this invention to provide a simple, rugged, durable and reliable bellows unit for actuation of the assembly valve element.

It is a further object of this invention to provide an improved bellows unit for steam trap assemblies, as discussed above, which is of simple, economical design, effective and reliable in operation for long periods, and easy to manufacture, maintain, and repair.

In general, the objects of this invention are achieved by a bellows unit for a thermostatic trap device, said device generally of the type, comprising an elongated hollow casing member, a valve element, a valve seat element, and a thermostatic bellows unit operatively connected to the valve element to actuate the valve in accordance with bellows unit action as it is exposed to differing media, said bellows unit generally comprising an extensible hollow bellows assembly constructed and arranged to be operatively mounted in a thermostatic trap device, said assembly defining an interior closed space, said unit further comprising means cooperating and operatively associated with said bellows assembly for supporting a body of condensed liquid inside said trap device and exteriorly of said bellows assembly in operative heat exchange relationship with said hollow bellows assembly and its interior space so that upon sharp reduction of pressure inside said trap device and exteriorly of said bellows assembly, liquid supported by said means will vaporize to cause significant cooling of said bellows unit and its interior space to prevent damage due to forces tending to extend said bellows assembly.

Other objects and advantages will appear from a consideration of the following specification and claims taken in conjunction with the accompanying drawings in which:

Figure 1:
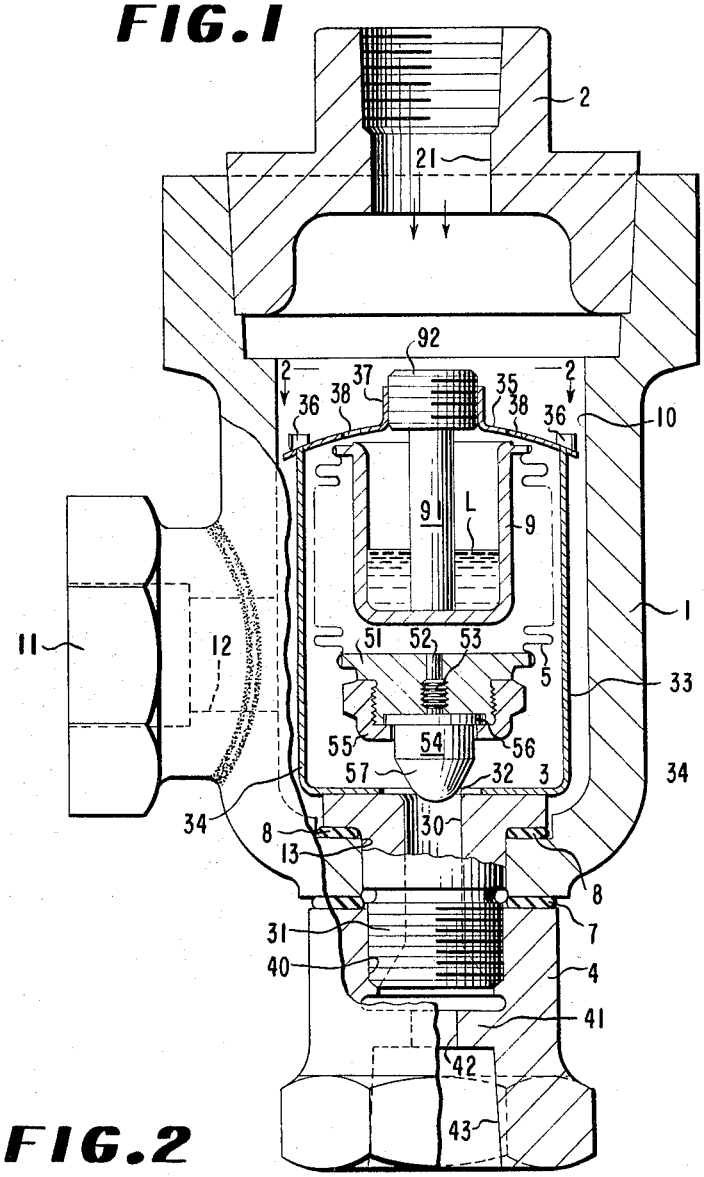
FIGURE 1 is a side elevational view of a thermostatic trap device embodying principles of this invention with portions broken away and shown in section to more clearly show the construction and arrangement of parts.
Figure 2:
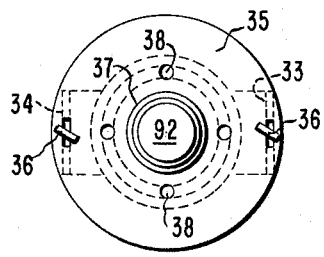
FIGURE 2 is a view of the removable bellows-valve unit of the device of FIGURE 1 taken at line 2—2 of FIGURE 1.
Figure 3:
FIGURE 3 is a schematic side elevation of a modified bellows unit of the present invention adapted for horizontal disposition of the bellows unit. Certain parts are shown in section to better illustrate the construction.

An improved steam trap device embodying features of this invention is shown in detail in FIGURES 1 and 2 of the drawings. An elongated outer casing or housing 1 is provided with an outlet end having an opening 13, a main inlet fitting 2 having an inlet passageway 21, and an alternate inlet 11 having a passageway 12. Both passageways are in communication with the hollow interior 10 of housing 1. For the purposes of this description, normal flow through the housing 1 is shown by the arrows in FIGURE 1.

A detachable sub-assembly unit is mounted in the hollow interior portion 10 of housing 1. This sub-assembly comprises in combination, a valve seat element 3, and a bellows unit for actuating the valve element 57, all linked together or operatively interconnected by frame structure as shown. The frame structure comprises a U-shaped bracket with upwardly extending arm portions 33 and 34, which bracket is secured by suitable means such as welding or brazing to the upper surface of the valve seat element 3 as shown in FIGURE 1. Valve seat element 3 is provided with a passageway 30 extending therethrough and a valve seat structure 32 arranged to cooperate with valve element 57. A substantially circular element 35 is secured in horizontally disposed position at the upper extremities of arm portions 33 and 34 as shown in FIGURE 1.

A vertically disposed shaft 91 having an upper enlarged threaded portion 92 is secured in an upwardly extending sleeve portion 37 of element 35. Element 35 is secured in position by means of twisted lugs 36 formed in the upper ends of arm portions 33 and 34 and extending through suitable openings formed at opposed sides of element 35 as shown in FIGURES 1 and 2. Element 35 is provided with a number of circular openings 38 extending therethrough. A cup-like element 9 is secured to the lower end of shaft 91. Element 9 is an upper end closure element for hollow extensible bellows element 5 which is vertically disposed between upwardly extending arm portions 33 and 34. It will be seen in FIGURE 1 that element 35 is positioned between the liquid in element 9 and the incoming steam passing through inlet passage 21. Element 35 deflects incoming steam away from the liquid in cup element 9. At the lower end of bellows element 5 is secured a lower end closure element 51 which has a passageway 52 therethrough for the purpose of access to the interior portion 2 of the bellows assembly. Passageway 52 is sealed by a threaded plug 53. A valve member 54 provided with valve element portions 57 is clamped in position on lower end closure element 51 of the bellows assembly by apertured threaded cap element 55.

Valve seat element 3, as viewed in FIGURE 1, is provided with a downwardly extending threaded portion 31 fitted through lower opening 13 in housing 1. Threaded portion 31 of element 3 is received and secured in the threaded recess in the upper end of outlet element 4 as shown in order to secure the bellows unit in position in housing 1. Suitable sealing gaskets or rings 7 and 8 are provided as shown. Outlet element 4 is provided with an outlet passageway 43 which communicates with passageway 31 in valve rest element 3. The outlet passageway in element 4 preferably is provided with a restricted portion 42 formed by annular inwardly extending flange structure 41.

Restricted portion 42 in the outlet passageway acts to control flow through the assembly to reduce the pressure drop across valve seat 3 when in the open condition which reduces erosion on valve seat 3 and valve element 57. In addition, this reduced pressure drop results in a lower closing force on the seat and valve which contributes to prolonged operation at high pressures and temperatures without damage. The bellows assembly which comprises upper and lower closure portions 9 and 51 as connected by extensible corrugated tubular wall 5 may be of conventional thermostatic bellows construction. Preferably, however, the bellows assembly is completely solidly filled with a deaerated substantially incompressible liquid only, such that no air or gas remains in the extreme radial extremities of the annular corrugations. Such air or gas located or trapped in these locations renders the bellows maxmaterial as such locations much more vulnerable to extreme working and deformations beyond its elastic limits when subjected to sharp or sudden pressure changes.

The preferred basic trap design is more fully disclosed in my copending application Serial No. 170,091, filed January 31, 1962, now Patent No. 3,146,947.

Referring to FIGURE 1, the operation of the trap device is generally as follows: When the vapor, at operating temperature, entering the trap device and surrounding the bellows assembly brings the medium in the space inside the bellows to the same temperature as the vapor, then the pressure in the space inside the bellows assembly will be substantially the same as the pressure in the trap device surrounding the bellows assembly. Since under this condition the effective area of the lower or extensible end portion of the bellows assembly exposed to internal pressure tending to close the valve opening is greater than the effective area exposed to pressure tending to open the valve, the valve element 57 is maintained in closed position against the valve seat 32. Condensation of vapor to liquid in the trap and in reservoir element 9 at the temperature of the vapor will not change these conditions. However, heat transfer to lower temperature ambient surroundings outside the trap device through the walls of trap device housing 1 will cause temperature of the condensed liquid and trap interior to drop below operating vapor temperature. Although the ambient pressure outside the bellows assembly will not drop since its supply pressure is maintained, the pressure inside the bellows assembly will decrease since it is in a separate system. When the temperature and pressure inside the bellows assembly drop beyond a certain point, the external pressure on the surface of the bellows assembly tending to open the valve will prevail and cause the valve to open to the position shown in FIGURE 1. This action discharges condensate through the trap until vapor at its operating temperature again enters the space in the trap device surrounding the bellows assembly to heat the bellows interior to about the vapor operating temperature and close the valve again.

It has been found in conventional trap devices of this general nature that when a sudden reduction in pressure, at high temperatures, takes place in the space surrounding the bellows assembly, for example if a vapor supply valve upstream of the trap is shut off while the trap valve is open, or if the trap valve opens a short period after such supply valve is cut off, the high temperature and pressure inside the bellows assembly relative to conditions in the space surrounding it, cause the bellows to close the valve element against the valve seat very violently with great force and impact. This many times overstresses and damages the parts of the unit sufficiently to render the trap completely inoperative. A major portion of such damage is to the bellows corrugations causing them to deform and be overstressed. Such bellows deformation may take the form of "squirming" and causes not only non-alignment of seat and valve making trap inoperative but also may rupture the bellows.

Applicant has overcome this operating deficiency of conventional traps and improved the normal closing action of these traps by providing a reservoir, such as is formed by element 9, to collect condensed vapor in a liquid pool in good heat exchange relationship to the bellows assembly when the trap valve is closed so that when the pressure outside the bellows assembly drops suddenly, with or without a temperature drop, the liquid will vaporize to remove heat energy from the bellows and its interior space to cool the same and reduce the violence of the valve closing action caused by the pressure drop, even when the vapor operating conditions involve very high pressures and temperatures. This bellows design of applicant has in fact prolonged trap and bellows operating life at high temperatures and pressures. Preferably, as shown in the drawings, the liquid reservoir extends into the bellows assembly interior space not only to get maximum heat transfer from the interior space to the liquid in the reservoir, but also to reduce the interior space to reduce in turn the stored internal energy and thermal expansion of the medium placed in the bellows assembly interior. The larger that the reservoir is made relative to the enclosed space within the bellows proper, up to a certain point, the greater will be its heat transfer surface for cooling the medium within the bellows and the smaller will be the stored internal energy of the medium inside the bellows proper requiring heat transfer to reduce the destructive forces within limits which will not destroy the operative parts of the trap.

It will be seen from the preceding discussion and description that applicant has provided an improved bellows unit and trap device with features which bring about prolonged operating life and significantly increased pressure and temperature limits. Other advantages and benefits are believed to be apparent.

It is believed that numerous modifications within the spirit of this invention will occur to those skilled in the art, and all such are considered to fall within the scope of the following claims.

What is claimed is:

1. An improved thermostatic steam trap assembly for operating in high pressure environments above 300 p.s.i., said trap assembly comprising an elongated hollow casing member, said member comprising an inlet passageway, a valve element, a valve seat element and a thermostatic extensible hollow bellows unit containing a vaporizable liquid and operatively connected to the valve element to actuate the valve in accordance with the vaporization and condensation of liquid in said bellows unit as said unit is exposed to differing media, said bellows unit mounted in a position upstream of said valve and valve seat elements in a zone of elevated pressure and temperature, said bellows unit defining an interior closed space containing the vaporizable liquid, said trap assembly further comprising means cooperating and operatively associated with said hollow bellows unit for supporting a body of condensed liquid of predetermined volume inside said trap assembly and exteriorly of said hollow bellows unit, said means maintaining substantially all of said body of liquid in operative heat exchange relationship with said hollow bellows unit and its vaporizable liquid-containing interior space, the volume of said liquid and the heat exchange relationship so determined that upon sudden reduction of pressure in said zone of elevated temperature and pressure upstream of said valve and valve seat elements inside said trap assembly and exteriorly of said bellows unit, sufficient liquid supported by said means will vaporize and absorb heat energy from said bellows unit and its vaporizable liquid-containing interior space to cool said bellows unit and the contained vaporizable liquid to a degree which will reduce forces related to the sudden pressure drop, and tending to overextend said bellows unit, sufficiently to prevent damage to said unit and its parts, said means comprising structure cooperating with said hollow bellows unit and defining a reservoir element for collecting and holding liquid condensed within the trap assembly in which said bellows unit is installed and exteriorly of said hollow bellows unit, said reservoir element maintaining said liquid in contact with the hollow bellows unit in operative position to absorb heat energy from said unit and its interor space, said hollow bellows unit comprising an elongated hollow portion having annular corrugations, a first end closure portion, and a second end closure portion cooperating to define the interior space of the bellows unit, said reservoir element being operatively disposed to maintain liquid in contact with said hollow bellows unit, said reservoir element being a cup-like configuration formed in one of said end closure portions, said cup-like configuration provided with a bottom portion thereof extending into the interior space of said hollow bellows unit to significantly reduce the interior space therein and expose the major part of the reservoir exterior surface in the vaporizable liquid-containing interior space of said hollow unit in effective heat exchange relationship therewith.

2. The improved trap assembly of claim 1 which further comprises a structural element positioned between a liquid in said reservoir element and said inlet passageway, said structural element constructed and arranged to protect said liquid in said reservoir element from the direct effects of incoming steam flowing into said unit by deflecting incoming steam away from said reservoir element.

References Cited by the Examiner
UNITED STATES PATENTS

| | | | |
|---|---|---|---|
| 903,465 | 11/1908 | Fulton | 251—335.2 |
| 1,077,731 | 11/1913 | McAlear | 236—58 |
| 1,109,705 | 9/1914 | Serrell et al. | 236—58 |
| 1,881,246 | 10/1932 | Simpson | 236—58 |
| 2,022,722 | 12/1935 | Hyatt | 236—56 |

FOREIGN PATENTS

| | | |
|---|---|---|
| 556,830 | 4/1923 | France. |
| 318,381 | 1/1920 | Germany. |

ALDEN D. STEWART, *Primary Examiner.*